Sheet 1 - 2 Sheets.

H. Tucker,

Bed Bottom,

No. 3,081. Reissued Aug. 11, 1868.

Witnesses:
N. Austin Parker.
C. Ernest Cadne.

Inventor:
Hiram Tucker.

N. PETERS, PHOTO-LITHOGRAPHER, WASHINGTON, D. C.

Sheet 2-2 Sheets.

H. Tucker,

Bed Bottom,

No. 3,081. Reissued Aug. 11, 1868

Witnesses:

W. B. Crosby

W. Hlader.

Inventor:

Hiram Tucker

N. PETERS, PHOTO-LITHOGRAPHER, WASHINGTON, D. C.

United States Patent Office.

TUCKER MANUFACTURING COMPANY, OF BOSTON, ASSIGNEES, BY MESNE ASSIGNMENTS, OF HIRAM TUCKER, OF NEWTON, MASSACHUSETTS.

*Letters Patent No.* 13,188, *dated July* 3, 1855; *additional improvement No.* 165, *dated June* 9, 1857; *reissue No.* 683, *dated April* 5, 1859; *reissue, No.* 112, *dated August* 6, 1861; *reissue No.* 3,081, *dated August* 11, 1868.

IMPROVED SPRING-BED BOTTOM.

The Schedule referred to in these Letters Patent and making part of the same.

TO ALL WHOM IT MAY CONCERN:

Be it known that I, HIRAM TUCKER, of Newton, formerly of Cambridgeport, in the county of Middlesex, and State of Massachusetts, have invented certain new and useful Improvements in Bed-Bottoms, or bed-foundations, or mattress-supporters, and that the following, taken in connection with the drawings, is a full, clear, and exact description thereof.

The drawings are in two sheets—

Sheet A being a representation of a bed-bottom made according to the principles of my invention, with the slats or bearers arranged crosswise of the bed.

Sheet B being a representation of a bed-bottom with the slats or bearers supported in a similar manner, but arranged longitudinally, or in a direction from the head to the foot of the bed.

In Sheet A—

In Sheet B—

Figure 1:
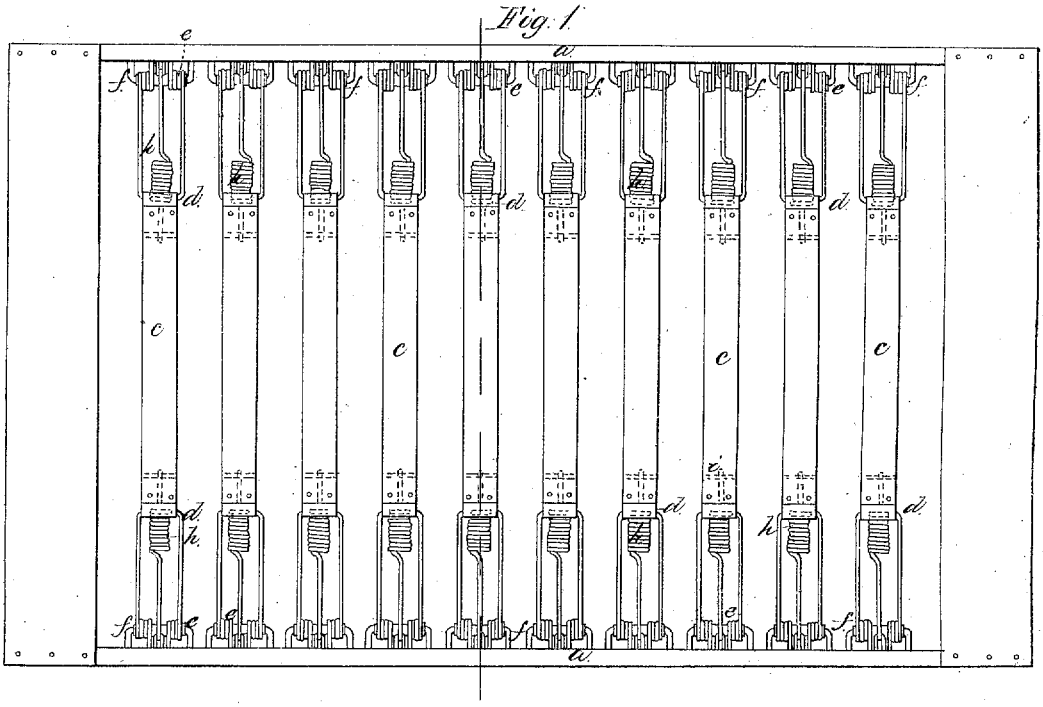
Figure 1 is a plan of the bed-bottom.

Figure 1 is a plan of the bed-bottom with the slats or beams arranged longitudinally.

Figure 2:
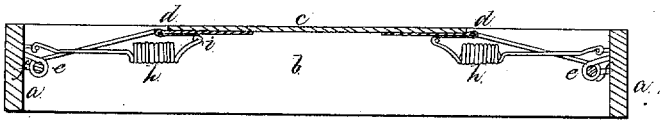
Figure 2 is a vertical section through one of the slats when no weight is imposed thereon.

Figure 2 is a longitudinal vertical section, and

Figure 3:
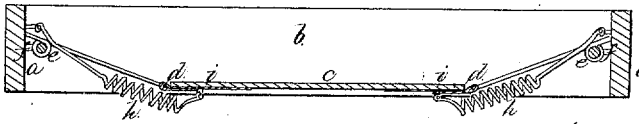
Figure 3 is a similar section, showing the position of the parts when a heavy weight is laid thereon.
Figure 1:
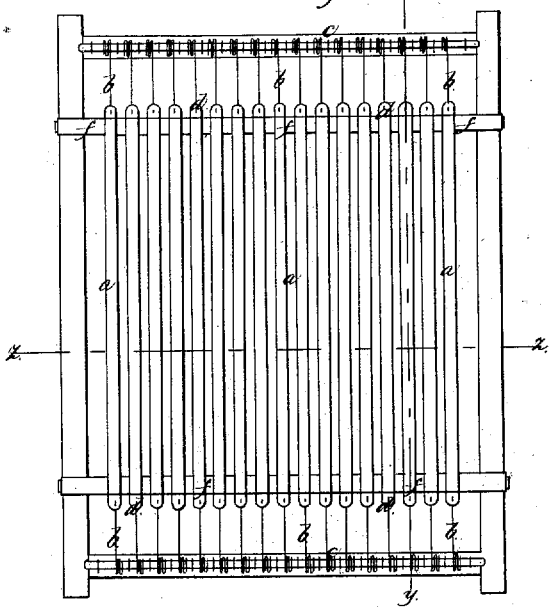
Figure 2:
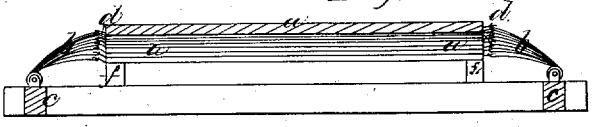
Figure 3:
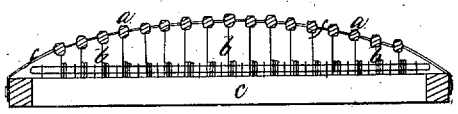

Figure 3 is a transverse vertical section through the same.

The same letters refer to the same parts in all the figures.

My invention is based upon the combination, by certain means, of a series of slats, bars, or supporters of wood, with a quadrilateral frame or box without a top. This frame I prefer to make separate from the bedstead, and it has side-rails, and a head and foot-rail, and the principal and efficient means for combining the slats with the frame are what I term stirrup or lifter-springs, using, by preference, springs which are coiled, and act by coiling and uncoiling.

In all the drawings the side-rails are shown at *a a*, the head and foot-rails at *b b*, and the slats or bearers at *c c*.

The frame or box may be made in any proper or usual manner, and the slats are of wood, similar to ordinary bedstead-slats, such as have been known for years. Each slat has at each end thereof a flexible band-loop, *d*, made, by preference, of webbing, linen, or leather, and these band-loops are attached to the slats and to the ends of the stirrup or lifter-springs, the object of the loops being that the ends of the springs may be connected to the slats as it were by a link or hinge, so that the elevation and depression of the slat shall not injure the spring.

The lifter or stirrup-springs, which support each slat at or near its ends, I prefer to make of coiled wire, as clearly shown at *e e*, (especially on Sheet A,) and there may be one or two springs at each end of each slat. One end of these springs is fast to the bed-rail; the other end takes hold of the stirrup.

When two springs are employed at each end of each slat, they occupy some space in the direction of the width of the slat, and tend to prevent a tipping of the slat, or a tendency to roll over in the direction of its width. By studying the action of these springs it will be perceived that their free ends rise and fall, when weight is imposed upon and removed from the slats, in curves approaching to arcs of a circle, and that the springs act like straight levers supported by upholding springs, and such contrivances may be employed in place of the springs shown in the drawings. These stirrup or lifter-springs may be called radial, as their free ends, as before said, move in curves approaching to arcs of circles, of which the spring forms the radius. The coils of the springs shown in the drawings will, it is obvious, coil and uncoil as weight upon the slats is increased or diminished.

When I use coiled springs, either single or double, I prefer to enclose a cylindrical bar or rod within the coil, such as a part of the staples *f f*, of Sheet A, or the long rod *g g*, of Sheet B. Such a bar or rod prevents the coil from changing its shape and thereby being injured during use, and makes the springs move more regularly and equably while in wear. In Sheet A, these staples are shown as driven into the rails; in Sheet B, the rod is merely passed through and held in place by the coils.

I prefer to use, in combination with the lifting or stirrup-springs, when the slats are arranged transversely, helical tension-springs, *h h*, (Sheet A,) fastened at one end to ears, *i i*, extending downwards from the slats, and with their other ends hooked into staples driven into the side-rails, (see Sheet A.)

The object of these springs is not so much to prevent depression of the bearers or slats when weight is imposed upon them, as to prevent them from longitudinal swaying that would tend to injure the lifter or stirrup-springs.

When the slats are arranged longitudinally, I prefer to attach each slat to its neighbor, and the outside slats, if desired, to the side-rails by flexible bands extending across the frame, as shown at *k k*, (Sheet B.)

These bands may be common webbing, and it is evident that when they are employed, it will be impossible for any slat to descend far without carrying its neighbors along with it, thus bringing into force the lifting action of at least three sets of the stirrup-springs. These bands also tend to prevent tilting, tipping, or rolling over of the slats, and are most useful when only one lifting-spring is employed at each end of each slat.

When the slats are arranged transversely, with a mattress resting upon them, they form an excellent bed-bottom, but each person upon the bed acts upon and is supported by every bar or slat in the series. This arrangement, therefore, presents a slight inconvenience when two persons occupy the bed; for then a change of position of one of them necessarily moves the mattress under the other, and when one gets out of the bed, the mattress not only changes its elevation, but its angle of inclination.

This inconvenience is really of no great importance, but may be raised as an objection not only to my own but to all former spring-bed bottoms. I have entirely obviated this objection by arranging slats supported by springs lengthwise of the bed, and I believe myself to be the first who ever arranged slats supported by springs longitudinally under a mattress, or in a bed-bottom or a bedstead.

When the bars or slats are arranged longitudinally, two persons can repose upon the bed without either of them being directly supported by the bars or slats which sustain the other. By this arrangement the bed can conform itself to two persons, as the bars and springs by which each person is supported are not pressed downwards by the weight of the other, and neither of the two can exercise any disagreeable control over the parts of the bed which support the other.

This new longitudinal arrangement of slats supported upon springs, is, therefore, not a mere formal change of arrangement, but one of those alterations of the position of parts which involves a new mode of operation.

I claim, as of my own invention—

1. The combination of a series of wooden slats or bars with a frame or box, by means of two stirrup or lifter-springs for each slat, by which the latter is supported at or near the ends thereof, substantially as set forth.

2. The combination of each of a series of wooden slats or bars with a frame or box, by means of coiled stirrup or lifter-springs supporting the slats, and being coiled by weight imposed upon the slats, and uncoiling themselves as weight is removed from the slats, the combination being substantially such as described.

3. The combination of a series of wooden slats with a frame or box, by means of two springs supporting each end of each slat, and acting by coiling and uncoiling, whereby each slat is not only supported, but also prevented from rolling, substantially as specified.

4. The combination of cylindrical rods or bars enclosed in the coils, with coiled springs supporting wooden slats in a bed-bottom, substantially in the manner set forth.

5. The combination of each of a series of wooden slats with a bed-bottom by means of stirrup or lifter-springs and a band loop, whereby each slat is supported at or near the end thereof, substantially in the manner specified.

6. The combination of a series of wooden slats with a frame by means of lifting-springs and tension-springs, substantially as described.

7. A series of wooden slats, arranged longitudinally in a frame, in combination with the head and foot-rails thereof, by means of springs, substantially in the manner and to produce the results specified.

8. A series of wooden slats, arranged longitudinally in a frame, in combination with the head and foot-rails thereof, by means of springs, and in combination with each other, by means of a flexible band, this combination being substantially such as specified.

HIRAM TUCKER.

Witnesses:

H. AUSTIN PARKS,

E. ERNEST CADUC.